(12) United States Patent
Kunstetter et al.

(10) Patent No.: US 10,778,868 B2
(45) Date of Patent: Sep. 15, 2020

(54) METHOD AND SYSTEM FOR AMPLITUDE MODULATED SCREENING AND PROTECTING PRINTOUTS, COMPUTER PROGRAM, PRINTING DEVICE AND PRINTED PRODUCT

(71) Applicant: HEIDELBERG POLSKA SP Z O.O, Warsaw (PL)

(72) Inventors: Andrzej Kunstetter, Warsaw (PL); Marek Chmielewski, Wyszkow (PL); Tomasz Jasinski, Warsaw (PL)

(73) Assignee: Heidelberg Polska Sp z o.o, Warsaw (PL)

( * ) Notice: Subject to any disclaimer, the term of this patent is extended or adjusted under 35 U.S.C. 154(b) by 0 days.

(21) Appl. No.: 16/139,230

(22) Filed: Sep. 24, 2018

(65) Prior Publication Data

US 2019/0098173 A1 Mar. 28, 2019

(30) Foreign Application Priority Data

Sep. 23, 2017 (EP) ..................................... 17461612

(51) Int. Cl.
*G03G 15/00* (2006.01)
*H04N 1/405* (2006.01)
*H04N 1/40* (2006.01)

(52) U.S. Cl.
CPC ......... *H04N 1/4051* (2013.01); *G03G 15/556* (2013.01); *H04N 1/40043* (2013.01); *H04N 1/4055* (2013.01)

(58) Field of Classification Search
CPC .. H04N 1/405; H04N 1/00485; H04N 1/4055; H04N 1/4051; H04N 1/4057
See application file for complete search history.

(56) References Cited

U.S. PATENT DOCUMENTS

| | | | | |
|---|---|---|---|---|
| 5,615,021 A | * | 3/1997 | Lin | ...................... H04N 1/4055 347/15 |
| 5,734,752 A | * | 3/1998 | Knox | .................... G06T 1/0028 235/494 |
| 8,171,567 B1 | * | 5/2012 | Fraser | ................... G06T 1/0021 726/32 |
| 8,441,688 B2 | | 5/2013 | Kawamura et al. | |

(Continued)

FOREIGN PATENT DOCUMENTS

WO 2013119235 A1 8/2013

*Primary Examiner* — King Y Poon
(74) *Attorney, Agent, or Firm* — Laurence A. Greenberg; Werner H. Stemer; Ralph E. Locher

(57) ABSTRACT

A computer-implemented method for generating an amplitude modulated multi-cluster halftone dot for use in an amplitude modulated screen includes determining an arrangement of clusters within the dot; determining a cluster function for each cluster, the cluster function defining a pixel sequence indicating a sequence of turning on device pixels within an area of a particular cluster; determining a dot function for the dot, the dot function defining a cluster sequence indicating a sequence of the clusters; and generating a set of data representative of the dot for a particular tonal value, by determining the device pixels within the dot turned on for that particular tonal value according to the cluster functions and the dot function. A computer program, a printing device and a printed product are also provided.

13 Claims, 8 Drawing Sheets

(56) References Cited

U.S. PATENT DOCUMENTS

| | | | |
|---|---|---|---|
| 8,576,449 B2 | 11/2013 | Bernal et al. | |
| 2006/0096479 A1* | 5/2006 | McCrea | B41C 1/00 |
| | | | 101/401.1 |
| 2007/0024914 A1* | 2/2007 | Chung | H04N 1/4055 |
| | | | 358/3.26 |
| 2009/0034008 A1 | 2/2009 | Croft et al. | |
| 2011/0058254 A1* | 3/2011 | Choi | G03C 9/00 |
| | | | 359/463 |

\* cited by examiner

Fig. 2 – STATE OF ART

10%  50%  90%

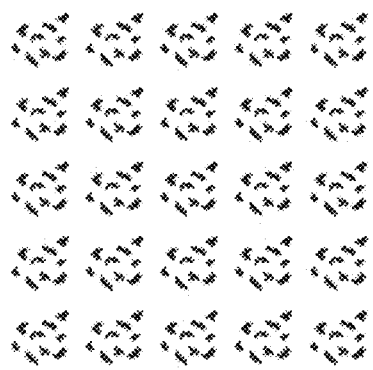
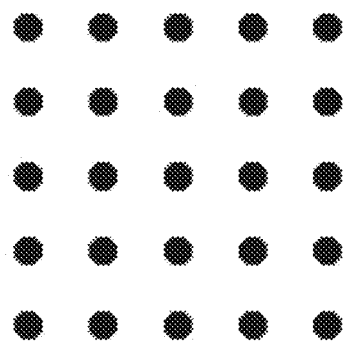
FIG. 7A  FIG. 7B
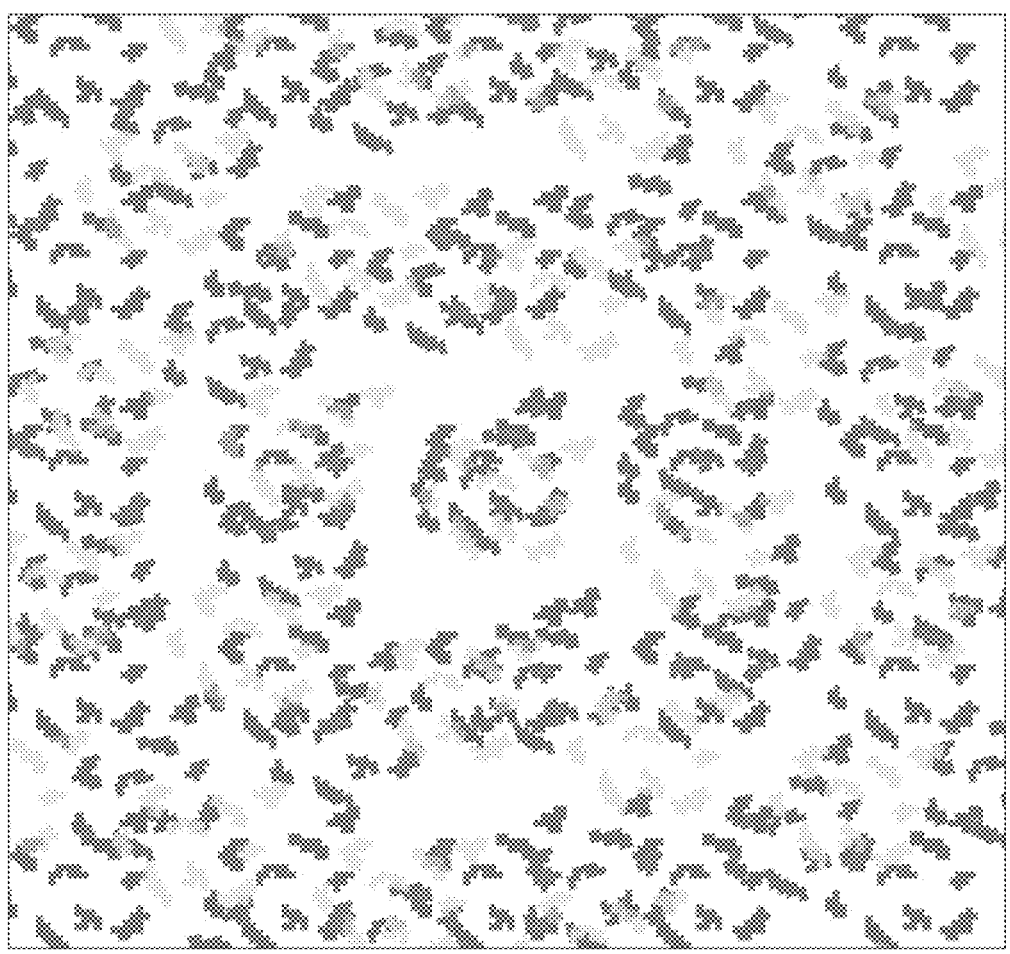
FIG. 8

ID 1 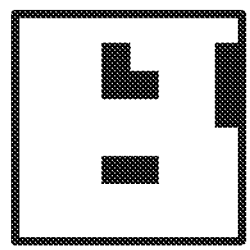
ID 2 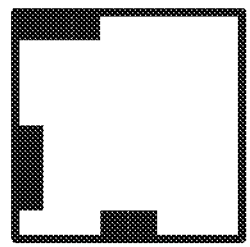
ID 3 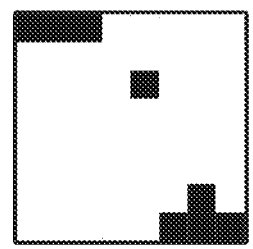
FIG. 10

METHOD AND SYSTEM FOR AMPLITUDE MODULATED SCREENING AND PROTECTING PRINTOUTS, COMPUTER PROGRAM, PRINTING DEVICE AND PRINTED PRODUCT

CROSS-REFERENCE TO RELATED APPLICATION

This application claims the priority, under 35 U.S.C. § 119, of European Patent Application EP 17461612.8, filed Sep. 23, 2017; the prior application is herewith incorporated by reference in its entirety.

BACKGROUND OF THE INVENTION

Field of the Invention

The present invention relates to offset printing, including amplitude modulated screening.

Offset printing makes use of printing plates with a surface formed of hydrophilic/oleophobic and hydrophobic/oleophilic areas corresponding to printing/non-printing elements of the image. Separate printing plates are used for each color used in the printing process.

A continuous tone image can be simulated by a halftoning technique, which reproduces the continuous tone by a screen of dots, varying in size or spacing. The quality of the printed image is highly dependent on the parameters of the screening process. The screening process may also influence the printing process flow and its costs, due to the required consumption of materials, inks, moisturizers or removers as well as the quantity, and thus the costs of the waste produced in the printing processes.

FIG. 1 shows a sequence of typical technological operations carried out to obtain a printout in an offset printing process. The process starts by providing a digital color, continuous tone image. The image is separated in step 101 by dividing it into the respective color separations, for example C, M, Y, K (Cyan, Magenta, Yellow, Key). As a result, continuous tone images are obtained which correspond with the respective color separations. Subsequently, in step 102, each continuous tone image is subject to a screening process to obtain a raster image, such as an amplitude modulated screen. Next, in step 103, printing plates are made corresponding to each of the raster images of the color separations. The printing plates are supposed to be installed in a printing press to transfer printing ink onto a surface/substrate to be printed.

Two basic types of screens are commonly used, namely: amplitude modulated screens (AM screens) and frequency modulated screens (FM screens).

AM screens have a regular raster structure divided to individual dots. Each dot occupies a square area to which a particular tonal value is mapped. The inverse of a distance between two dots is called a screen ruling, which can be expressed as a number of screen lines per unit length, typically measured in l/cm (lines per centimeter) or lpi (lines per inch). Another important AM raster parameter, which influences its operation, is a screen angle, which is a linear angle at which the screen is rotated with respect to a reference axis. Furthermore, the dots have a particular shape, defined by a dot function, that defines the device pixels within the area occupied by that dot, that shall be turned on or off depending on the tonal value to be represented by that dot. The dot function defines a shape of the dot (such as a circular shaped dot), which influences the shaping of the rasterized image, its properties and structure.

Due to the fact that a multi-color offset reproduction process involves printing one image over another, each image corresponding to a respective color separation of a subtractive (primary) basic color (including black color separation), in practice a so-called "triad" is used i.e. the colors C, M, Y, K: Cyan, Magenta, Yellow and Key. In some cases, special colors may also be used—independently or as a supplementation of the triad. When the color separation images are printed one over another (using semi-transparent inks), a multicolor printout is obtained. The structures of the overprinted color separations may interfere with each other, which results in an adverse effect called a Moiré effect. The Moiré effect is visible in particular when improper screen angles are used for respective color separations, resulting in periodical mutual strengthening and weakening of the image. This may lead either to the color instability of the reproduced image within the print batch, to color instability in different fragments of the image, or to visible regular imperfections of the image. This effect can be avoided by adjusting the screen angles.

Another phenomenon related to the offset printing process is a dot gain. The dot gain is related to the fact that the area of each printed element (i.e. halftone dot) has greater dimensions (both physical and apparent) than its dimensions on the printing plate. The physical dot gain is caused by rheological and physical phenomena which occur during the transfer of the ink from the printing plate onto the substrate. The apparent dot gain is an optical phenomenon. This phenomenon occurs for each printed element. However, the smaller the printed element, the higher the dot gain relative to the dimensions of the element. Therefore, the dot gain expressed in relative values (e.g. as a percentage of the element size) is negligible for dots having a large size, that is distinguishable for a human eye within an observation distance, whereas the dot gain is significant for dots having a size below the level of human eye resolution (as for the halftone dot sizes applied in most applications). The significant aggregate dot gain (physical and apparent) for halftone dots must be taken into account in the preprinting process. As specified by various norms, for AM screens with typical screen rulings, a dot representing a 50% tonal value has a corresponding dot gain of a dozen or so percent, which is mainly caused by the apparent (optical) dot gain. The dot gain effect cannot be avoided and may cause significant problems in stability of the printing process. Therefore, special procedures and norms (such as ISO 12647-2:2013) have been developed to sanction the dot gain on an averaged level and describe in details recommended corrections for the particular values.

A publication "*Color Digital Halftoning Using Multi-Cluster Halftone Dots*" (by Craig C. Cook, Cambridge University Press, 1991) describes multi-cluster dots, wherein a single dot is formed of a plurality of square or rectangular clusters. A dot function for these multi-cluster dots defines successive device pixels to be turned on within the dot, in such a way that each successive pixel is defined in a successive cluster and the dots are disposed in a distanced relationship from each other. FIG. 2 shows an example of a dot function for a dot having eight clusters according to that publication.

There is a need to improve the known methods of screening to improve at least one of the following: savings in ink consumption during the printing process, reduction of waste generated during the printing process, reduction in energy consumption, increase in quality of the printed product through increase in quality of mapping of details in the reproduced image or through reduction of undesired visibility of the screen structure.

Moreover, it would be advantageous to improve the screening process such as to achieve at least one of the following: protecting of the printed products against copying and counterfeiting, marking a printed product, marking of product packaging, identifying a manufacturer or a contractor of the printed product, identifying a product batch or series, product manufacturing site or product distribution area, verifying product authenticity.

SUMMARY OF THE INVENTION

It is accordingly an object of the invention to provide a method and a system for amplitude modulated screening and protecting printouts, a computer program, a printing device and a printed product, which overcome the hereinaforementioned disadvantages of the heretofore-known methods, systems, programs, devices and products of this general type.

With the foregoing and other objects in view there is provided, in accordance with the invention, a computer-implemented method for generating an amplitude modulated multi-cluster halftone dot for use in an amplitude modulated screen, the method comprising the steps of: determining an arrangement of clusters within the dot; determining a cluster function for each cluster, the cluster function defining a pixel sequence indicating a sequence of turning on of device pixels within an area of a particular cluster; determining a dot function for the dot, the dot function defining a cluster sequence indicating a sequence of the clusters; and generating a set of data representative of the dot for a particular tonal value, by determining the device pixels within the dot turned on for that particular tonal value according to the cluster functions and the dot function.

At least two clusters within the dot may have a different shape.

At least two clusters within the dot may have a different number of the device pixels.

The cluster function may define that the successively turned-on pixels are adjacent at least one pixel that is already turned on within that cluster.

The set of data representative of the dot may determine the device pixels that are turned on within a number of clusters corresponding to the desired tonal value, according to the cluster sequence determined by the dot function, wherein the device pixels within the respective clusters are turned on according to the sequence determined by the cluster function of the respective cluster.

The dot function may define that in at least one cluster at least two more device pixels are turned on than in the other clusters for at least one tonal value.

With the objects of the invention in view, there is also provided a computer-implemented method for generating a set of data representative of an amplitude modulated screen for a continuous tone image by amplitude modulated screening, wherein the halftone dots are generated according to the method described above.

With the objects of the invention in view, there is furthermore provided a computer program comprising a program code for performing all the steps of the computer-implemented method as described above when that program is run on a computer.

With the objects of the invention in view, there is additionally provided a computer program product representative of the set of data representative of the dot, generated by the method as described above.

There is also disclosed a computer program product representative of the set of data representative of the amplitude modulated screen, generated by the method as described above.

With the objects of the invention in view, there is also provided a method for printing, comprising printing an amplitude modulated screen generated by the method described above.

With the objects of the invention in view, there is furthermore provided a printing device comprising a device for performing the steps of the method as described above.

With the objects of the invention in view, there is additionally provided a printing product printed by the method described above.

With the objects of the invention in view, there is also provided a method for generating printing products, the method comprising: determining a printout identifier; generating a personalized dot function for generating a personalized halftone dot; generating the printing product according to the method described above by using the personalized dot function; and storing, in an authentication database, the printout identifier and personalized halftone dot data corresponding to that printout identifier.

With the objects of the invention in view, there is concomitantly provided a method for verifying authenticity of a printing product, the method comprising: receiving a printout identifier; receiving an image of a fragment of the printing product, at a resolution at which the shape of the halftone dots forming the printout screen are recognizable; determining, from an authentication database, a reference halftone dot shape corresponding to the printout identifier; comparing the shape of at least one halftone dot of the received image of the printing product with the reference halftone dot shape; and outputting the result of the comparison as an indicator of the authenticity of the printing product.

The method and system presented herein provide at least some of the following technical effects:
- savings of ink consumption during the printing process;
- reduction of waste generated during both a high volume and a low volume printing process;
- reduction of energy consumption due to improvement in preparation and execution of printing processes;
- increase of quality of the printed product achieved by better mapping of image details;
- increase of quality of the printed product by reducing the visible appearance of the screen structure.

Moreover, the possibility of personalizing the dot function for a particular printout is an effective security feature that provides the following:
- protecting of the printed product against copying and industrial counterfeiting;
- marking any types of printed products or products for which the printed product forms a packaging;
- identifying a manufacturer or a contractor of the printed product;
- identifying a batch or series of the printed product, product manufacturing site or product distribution area;
- verifying of product authenticity.

Other features which are considered as characteristic for the invention are set forth in the appended claims.

Although the invention is illustrated and described herein as embodied in a method and a system for amplitude modulated screening and protecting printouts, a computer program, a printing device and a printed product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a diagram showing an example of a prior art multi-cluster halftone dot;

FIG. 7A is a diagram showing an example of a 10×10 arrangement of the dots of FIG. 6A;

FIG. 7B is a diagram showing an example of a 10×10 arrangement of the dots of a typical AM screen;

FIG. 8 is a diagram showing a composition of three color separations, each having a tonal value of 10% and rotated at a particular screen angle with respect to a reference axis;

FIG. 10 is a set of diagrams showing an example embodiment of a database content;

DETAILED DESCRIPTION OF THE INVENTION

The present disclosure relates to a structure and a method for generating an amplitude modulated multi-cluster halftone dot.

A halftone dot as presented herein is generated on a basis of a dot function which determines a cluster sequence (of turning on of respective clusters), wherein each cluster has assigned a cluster function which determines a pixel sequence (of turning on of respective device pixels within an area of the particular cluster).

The halftone dot as presented herein includes at least one cluster that has a shape that is different form a rectangular shape. In particular, most clusters or all clusters of the dot have a shape that is different from the rectangular shape. Moreover, at least two clusters may include a different number of device pixels. As a result, the clusters of the halftone dot have different sizes and different shapes.

Figures 3, 4:
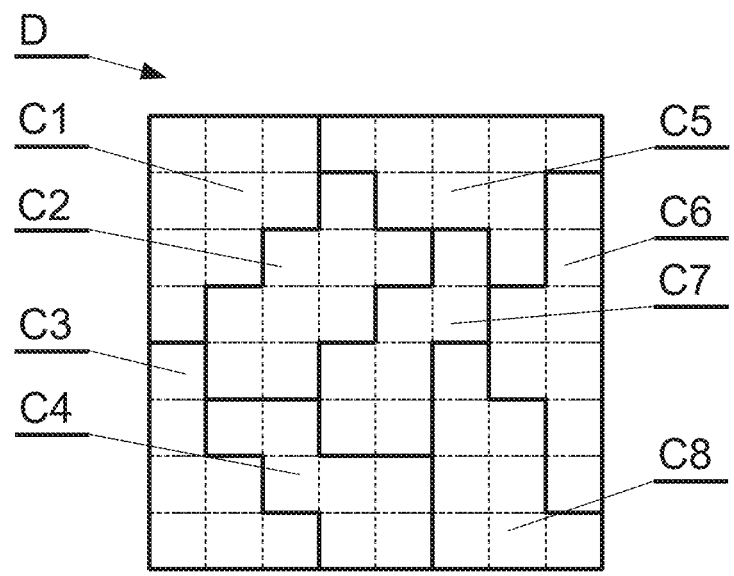
FIG. 3 is a diagram showing an example of a division of a multi-cluster halftone dot into clusters according to the present disclosure.
FIG. 4 is a diagram showing an example of a cluster function that determines a sequence of turning on pixels within particular clusters.

Referring now to the figures of the drawings in detail and first, particularly, to FIG. 3 thereof, there is a first embodiment of a halftone dot (D), having a size of 8×8 pixels. The dot (D) includes 8 clusters C1-C8. Such a dot (D) can be used to represent tonal values with a 6-bit resolution, i.e. 64 different tonal values.

The embodiment having an 8×8 size is shown as an example only. Dots of smaller or larger sizes can be constructed in an equivalent manner. For example, dots having a size of 16×16 pixels can be generated to represent tonal values with an 8-bit resolution, i.e. to represent 256 different tonal values. Larger dots can be generated as well, for example dots having a size of 100×100 pixels, which may be useful for low printout rulings, for example rulings lower than 34 l/cm (to form dots with a larger number of device pixels for the same resolution of an imagesetter). The larger the size of the dot, the higher the depth of the tonal values that may be represented by the dot and the higher the number of clusters that can be defined within the dot. Preferably, the dot is divided into at least 4 clusters, wherein each cluster includes at least 4 device pixels. The higher the number of clusters, the higher number of personalized dot functions for a printout.

The minimum number $P_{min}$ of device pixels in a single cluster is preferably at last:

$$P_{min} = \frac{\sqrt{K}}{2}$$

wherein K is a number of device pixels in the dot.

Within a single dot, the difference $\Delta P$ of device pixels between the cluster with the highest number of device pixels $P_{max}$ and the cluster with the lowest number of device pixels $P_{min}$ should not exceed:

$$\Delta P = P_{max} - P_{min} = 4\sqrt{K} - \frac{\sqrt{K}}{2}$$

wherein K is a number of device pixels in the dot.

FIG. 4 diagrammatically shows examples of cluster functions for the dot of FIG. 3. These cluster functions determine the sequence of turning on of the device pixels within the particular cluster. The cluster functions are selected such that the successively turned-on pixels are adjacent at least one pixel that is already turned on within that cluster. Preferably, the cluster function shall determine the sequence of turning on the pixels within the cluster that maximizes the perimeter of the shape resulting from the turned-on dots. This enhances the dot gain effect.

The dot function is determined before generating the raster image for a particular printout. The dot function determines the sequence of turning on the clusters. For example, the dot function may be as follows:
C7; C7; C2; C2; C2; C6; C6; C6; . . .

The dot function includes a sequence of cluster identifiers C1-C8, wherein the number of cluster identifiers C1-C8 in the sequence is equal to number of device pixels within the dot, and the number of occurrences of each cluster identifier in the dot function is equal to the number of device pixels within that cluster C1-C8.

A dot of a desired tonal value is generated by turning on the device pixels within a number of clusters corresponding to the desired tonal value, according to the sequence determined by the dot function, whereas the device pixels within the respective clusters are turned on according to the sequence determined by the cluster function of the respective cluster.

Figure 5:
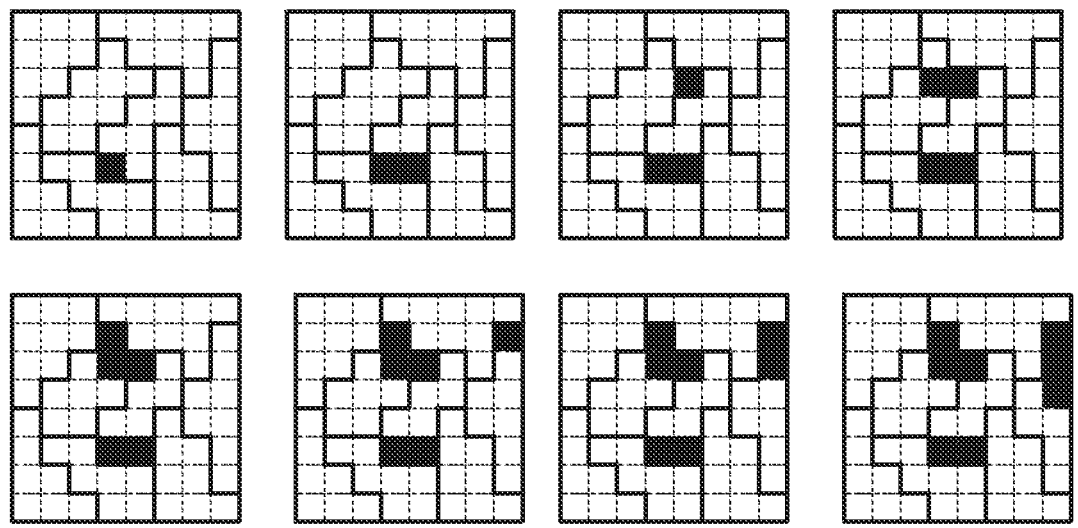
FIG. 5 is a set of diagrams showing examples of filling of the dots for consecutive tonal values according to the particular dot function.

FIG. 5 shows successive examples of a dot which is divided into clusters in accordance with FIG. 3 and has cluster functions defined as shown in FIG. 4, wherein the successive dots have 1, 2, 3, 4, 5, 6, 7 and 8 pixels turned on.

Preferably, the dot function can be selected such that the shapes formed in the respective clusters increase in a non-uniform manner (in contrast to the prior art multi-cluster dots, wherein device pixels are turned on for successive clusters in a uniform manner). In other words, the dot function can be selected so that in at least one cluster at least 2 more device pixels are turned on than in the other clusters for at least one tonal value. This will be illustrated by the following example, assuming that the dot includes four clusters: C1, C2, C3, C4. According to the prior art, the dot function (which determines the sequence of turning on of device pixels within the dot as a whole) defines turning on of the device pixels within successive such that pixels are turned on successively in clusters C1, C2, C3, C4, C1, C2, C3, C4, C1, C2, . . . etc. In contrast, as suggested above, according to the present disclosure, it is preferable to define a dot function that induces a gain in size of shape of one cluster earlier than of the other clusters within the dot. This can be accomplished, for example, by the following dot functions:

C1, C1, C1, C2, C2, C3, C4, C1, C2, C3, C4, C1, C2, C3, C4, C1, etc.

C1, C1, C1, C1, C2, C2, C2, C3, C3, C4, C1, C2, C3, C4, C1, C2, C3, C4, etc.

C1, C1, C2, C2, C1, C2, C1, C2, C3, C3, C4, C4, C1, C2, C3, C4, C1, C2, C3, C4, etc.

In other words, the increase of the turned-on cluster surface for some clusters is shifted in phase with respect to other clusters. This leads to the increase of the turned-on area in some clusters earlier than in the others. In the other words, for at least some tonal values, at least one cluster has a turned-on surface that is larger than the at least one of the other clusters by at least two device pixels.

This has a beneficial effect on the stability of the printing process. The number of small, solitary shapes is minimized as compared to the known printing techniques.

Figures 6A, 6B, 6C:
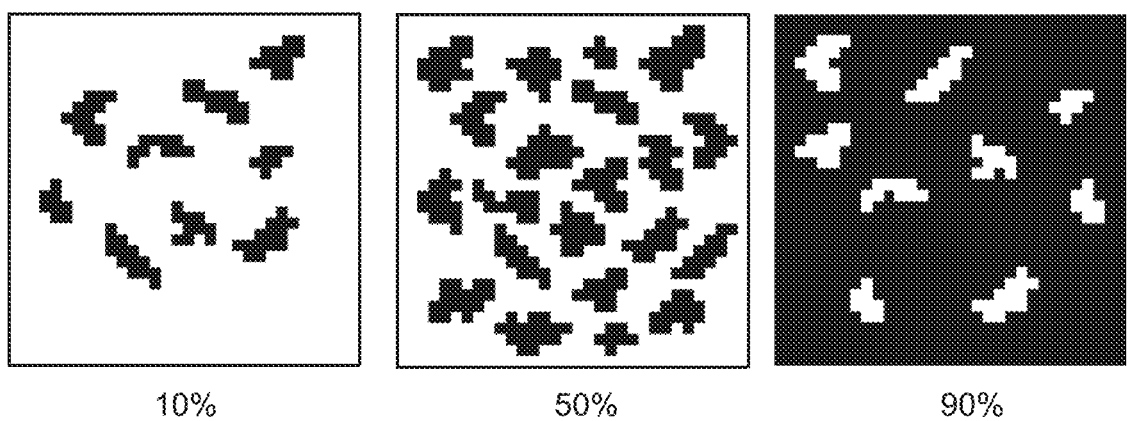
FIGS. 6A, 6B, 6C are diagrams showing show examples of dots having a tonal value of 10%, 50% and 90%.

FIGS. 6A-6C show examples of screens for tonal values of 10%, 50% and 90%. As follows from the comparison of FIG. 6A and FIG. 6B, for the tonal value of 10%, the device pixels in only eight clusters have been turned on, whereas for the tonal value of 50%, the device pixels in twenty-one clusters have been turned on. Thus, the device pixels, in the clusters shown in FIG. 6A, have been turned on before the pixels of the other clusters.

FIG. 7A shows a 10×10 arrangement of halftone dots having a 10% tonal value and a shape corresponding to that shown in FIG. 6A, whereas FIG. 7B shows, for comparison, the same arrangement of a typical AM screen having 10% halftone dots.

FIG. 8 shows an overlap of screens of three color separations, each having a tonal value of 10% and a shape as shown in FIG. 7A. The screens of the color separations are rotated with respect to each other at particular angles. The use of a screen as shown in FIG. 7A allows reducing the interference between the dot sub-elements, as compared to a typical AM screen of FIG. 7B.

Due to the fact that the dot function allows setting screen parameters in the screening process, an individual (personalized) dot function can be selected for a particular printout. A set of dot shapes corresponding to particular tonal values can be stored in a database along with a printout identifier, in order to allow later verification of the printout authenticity.

Figure 9:
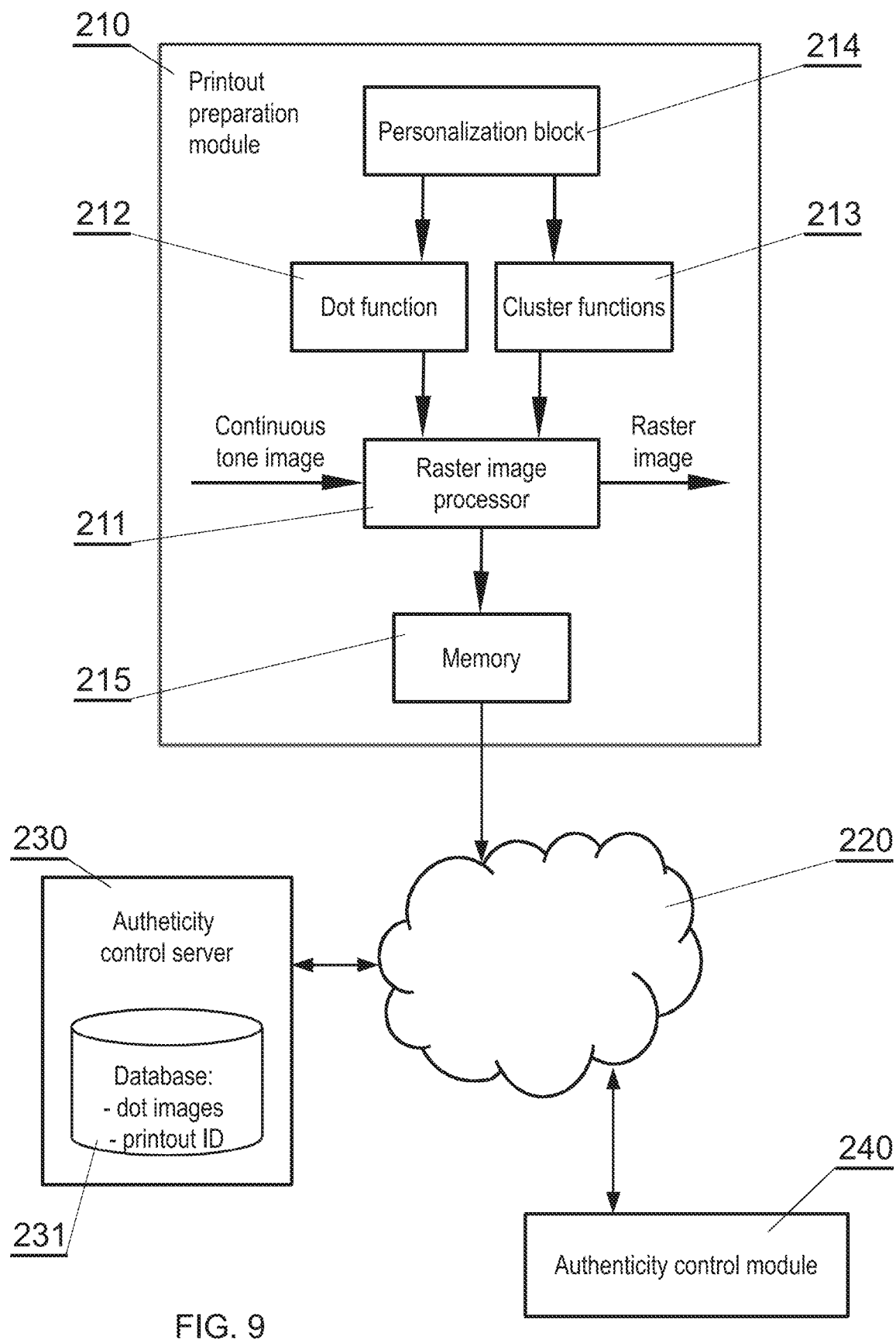
FIG. 9 is a diagram showing an example of a system for verifying authenticity of printouts.

FIG. 9 shows an example of a system for verifying authenticity of printouts. A printout preparation module 210 may be a software module installed in a pre-press station to control the raster image processor (which may be a hardware or software processor). A user may generate a personalized (i.e. individual for a particular printout) dot function 212 and/or a cluster function 213, by using a personalization block 214. For example, the cluster function 213 may be preset for a set of a plurality of printouts, and only the dot function 212 may be personalized for the printouts of that set. The cluster function 213 may be selected depending on the printout parameters (resolution, ruling, paper type). The dot function 212 may be determined manually—by the user, by inputting a sequence of cluster identifiers, or by selecting the cluster identifiers from a list. Alternatively, the dot function may be generated randomly. Based on the dot function 212 and the cluster functions 213, the screening processor generates an output screen image corresponding to the input continuous tone image. Furthermore, an image of at least one dot shape corresponding to the printout is stored in a memory 215, for example as an image. The personalized dot data are then sent to an authenticity check database 231 of an authenticity checking server, together with the identifier of the particular printout. The personalized dot data can be stored in various formats. For example, the halftone dot parameters, such as the dot size, the cluster arrangement, the cluster functions and/or the dot function can be stored in order to regenerate the dot images for authenticity check purposes. Alternatively, the dot images can be stored directly in the database, for example the following data can be stored:

a dot image for one particular tonal value, for example for a predefined tonal value (e.g. 50% tonal value) or for the tonal value which is most common within the image (determined by analyzing the image content), or for the tonal value present at a particular area of the image (such as a check area for verifying authenticity of the image);

dot images for a plurality of tonal values, for example for a plurality of predefined values (for example: 10%, 20%, 30%, 40%, 50%, 60%, 70%, 80%, 90% tonal values) or for values which are most common within the image (for example, for ten tonal values which occur most commonly within the image and differ from each other by a predefined threshold, determined by analyzing the image content) or for values which are present at the particular areas of the image (such as a plurality of check areas of different tonal values for verifying authenticity of the image).

Alternatively, the authenticity check database 231 can store the personalized dot function and the authenticity control server 230 includes the database 231 storing the printout identifiers and one or more dot images correlated with the particular printouts. The printout identifier may be, for example:

a trade name of a product correlated with the printout (in such a case, all the printouts correlated with this product shall be prepared with the screen generated with the particular dot function);

an individual special identifier determined by a sequence of signs printed on the product;

an identifier which is correlated with a sequence of signs, wherein the sequence of signs is assigned to the product, for example, the identifier may be a bar code or a matrix code.

A user of a product corresponding with the printout may verify the product authenticity by using an authenticity control module 240, which may be, for example, a software application installed on a mobile device, such as a smartphone application. The application provides a connection with the authenticity control server 230 and verification of whether the image of the dot that is read from the printout corresponds with the identifier of this printout.

The image of the dot may be read by the user, for example by using a magnifying glass (such as a 10× or 50× magnifying glass). In this case, the user may connect to the authenticity control server by using the authenticity control module 240 and provide the printout identifier to receive at least one dot image that is correlated with this printout identifier. In this case, the authenticity control module 240 will display this dot image to allow the user to determine by oneself whether the image corresponds to the image read from the product.

Alternatively, a user device serving as the authenticity control module 240 may be provided with a camera having a "macro" function (or a magnifying glass can be installed at the camera), in order to take a photo of a determined product area. In this case, the authenticity control module 240 may connect to the authenticity control server 230 to automatically compare the image of the halftone dots read from the product. The authenticity control module 240 may download an image of the halftone dot from the server 230 and compare it with the halftone dot image captured by the camera—in order to determine whether the images are similar or not. Moreover, the authenticity control module 240 may send the raster image to the server 230 and request a comparison of the images at the server 230, and subsequently the authenticity control module 240 may receive the comparison result from the server 230 to determine the authenticity or lack thereof.

The system shown in FIG. 9 allows efficient protection against copying of printouts, because the production of an unauthorized copy of the printout would require:
  inputting, into the printout preparation module, the dot function and the cluster function which are nonpublic and implicitly unknown to the outsiders;
  or, manual reconstructing of the shape of dots—at least for the elements encompassed by the printout, and next programming of such a screen shape, within the printout preparation module of the typical printing device—which would be theoretically possible, but extremely laborious in practice.

Moreover, a copy of the printout by using standard methods, i.e. by scanning and printing the image on standard printing devices, will have tonal values approximately corresponding with the tonal values of the authentic printout, but only if viewed at a macroscopic scale. However, when the copy of the image is viewed at a microscopic scale, it will have a typical screen which is used in the particular printing device for reproducing a printout (such as a standard AM screen of FIG. 7B), in which the image of image is substantially different from the printout image when viewed in magnification.

FIG. 10 diagrammatically shows an example embodiment of a database content 231 for three different printouts having identifiers: ID1, ID2, ID3. The database includes images of halftone dots corresponding to these identifiers, for the tonal value of 8/64 for the screen having the dot size of 8×8 pixels. The screens are prepared based on the cluster functions according to FIG. 3 and according to the following dot functions:
  for ID1: dot function=C7; C7; C2; C2; C2; C6; C6; C6; . . . such as in the embodiment of FIG. 5;
  for ID2: dot function=C1; C1; C1; C3; C3; C3; C4; C4; . . .
  for ID3: dot function=C8; C8; C8; C8; C1; C1; C1; C2; . . .

Figure 11:
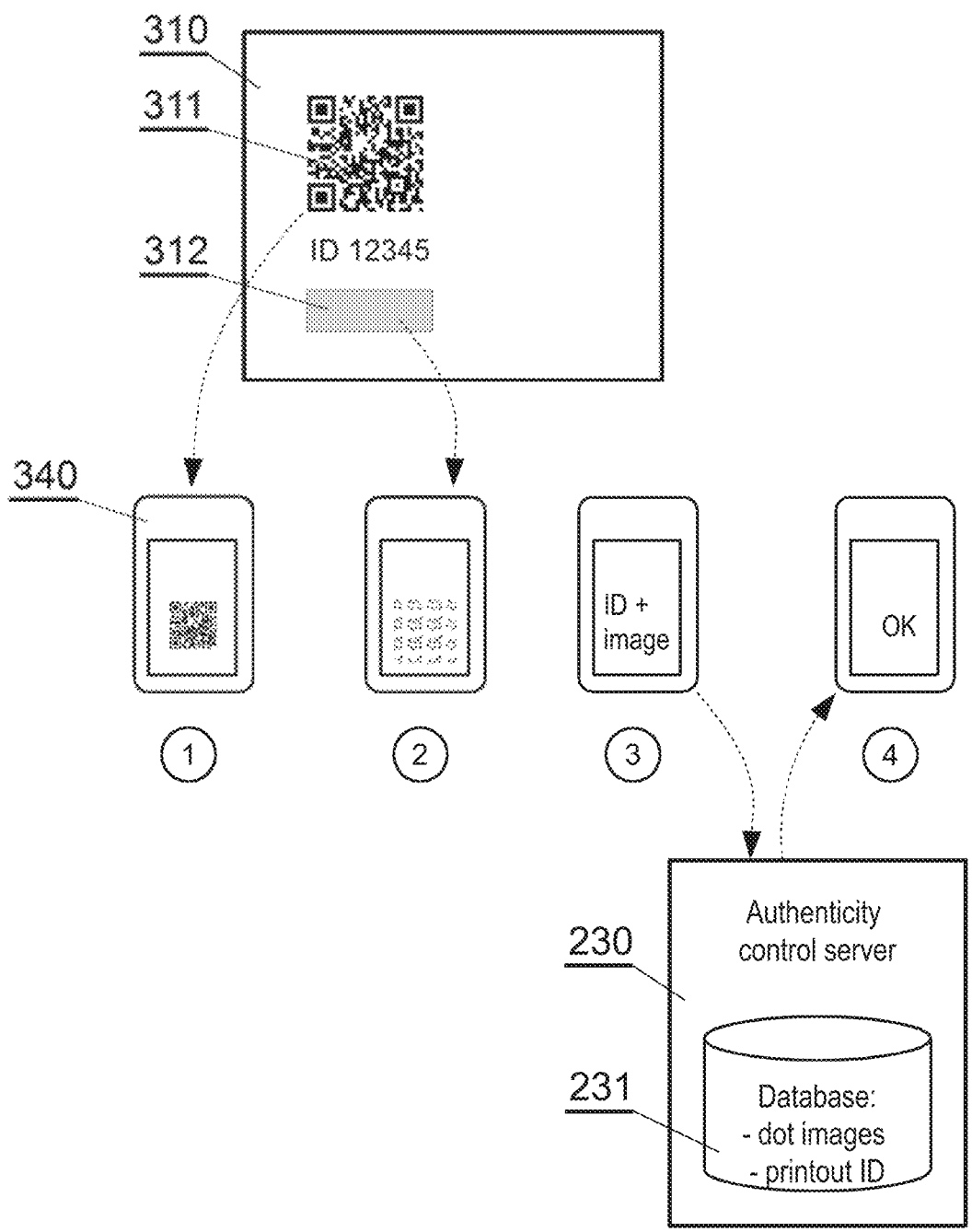
FIG. 11 is a diagram showing a process of verifying the authenticity of a document.

FIG. 11 diagrammatically shows a process of verifying the authenticity of a document 310, by using the system of FIG. 9. The document 310 includes a printout identifier 311, which can be for example a matrix code or an identifier readable for the user. Moreover, the document 310 includes a control field 312 which includes an image of a tonal value that has a corresponding dot image stored in the database 231. The image may have a uniform tonal value, or may be formed of a plurality of images, or may be an image of a variable tonal value (e.g. changing smoothly from lower to higher tonal values). First, the user initiates the process by inputting a printout identifier, for example by reading the matrix code from the printout (or by manually entering the identifier, e.g. a sequence of signs from the product packaging or entering the product trade name) by using a mobile device 340 provided with a camera (and optionally provided with a magnifying glass) and a software application 240 serving as the authenticity control module. In the second step, the user takes a photo of the control field 312 (i.e. a fragment of the printing product) to obtain an image of the AM screen at a resolution at which the shape of the halftone dots is recognizable. In the third step, the screen image and the product identifier are compared with reference data from the database content 231 of the authenticity control server 230. In the final step, the outcome of the comparison is presented to the user—a positive result (which confirms the authenticity) is presented when the captured screen image corresponds to the reference image stored in the database 231 for the particular printout identifier, or a negative result (which denies the authenticity) is presented when the captured screen image does not correspond to the reference image stored in the database 231.

Due to the significant difference of image between the dot shapes presented herein and typical AM or FM screen dot shapes, it is possible to initially verify the authenticity of the document (in the third step of the verification process), by checking whether the shape of the printed dot is similar to an expected dot shape (such as shown in FIG. 7A), or whether the shape of the dot is more similar to a standard screen dot (such as the AM screen dot of FIG. 7B). This does not require communicating with the server 230. The authenticity verification module 240 may, therefore, contain a set of typical screen shapes which are used in the standard printing devices featuring standard printouts which are not prepared according to the method of the present disclosure.

Figure 1:
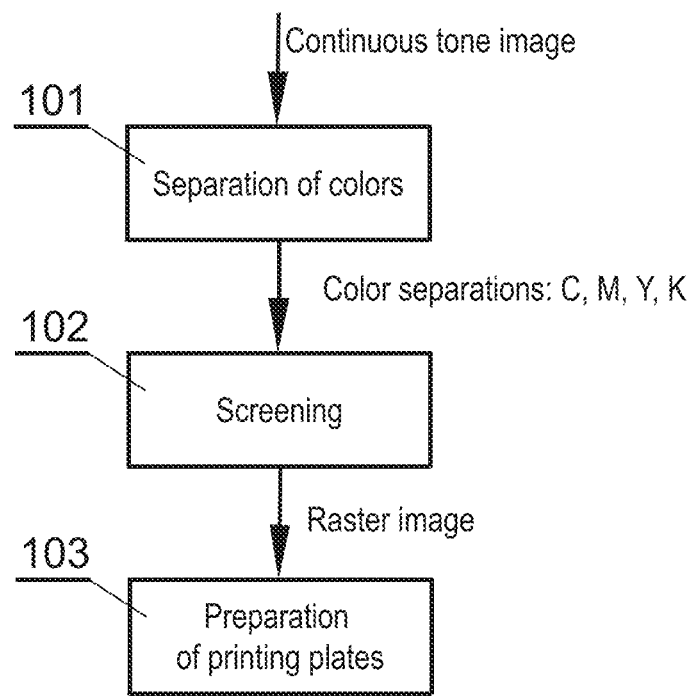
FIG. 1 is a flow diagram showing an overview of an offset printing process.
Figure 12:
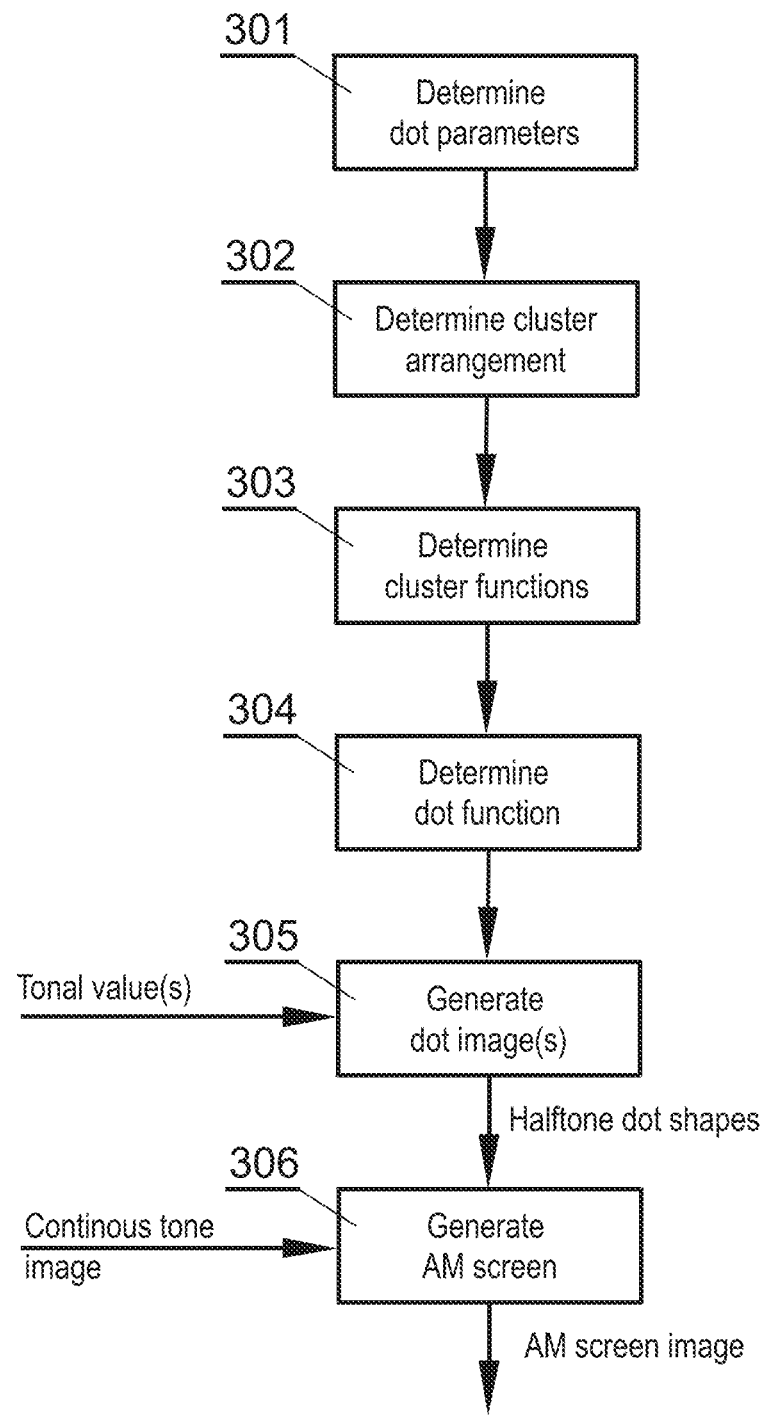
FIG. 12 is a flow diagram showing an overview of the method for generating an AM multi-cluster halftone dot and an AM screen.

FIG. 12 shows an overview of the method for generating an AM multi-cluster halftone dot and an AM screen for use in the printing method of FIG. 1. First, in step 301, dot parameters are defined, such as the dot size, e.g. 8×8 rectangular dot. Next, in step 302, an arrangement of clusters within the dot is determined, for example such as shown in FIG. 3. Then, in step 303, for each cluster a cluster function is defined, for example such as shown in FIG. 4. A dot function is determined in step 304, for example such as described with reference to FIG. 5. At least the dot function can be personalized for a given printout. Finally, in step 305, a set of data representative of the dot for a particular tonal value is generated, by determining the device pixels within the dot turned on for that particular tonal value according to the dot function, such as described with reference to FIG. 5. The data representative of the dot are generated in a format as used for a particular known raster image processor, according to the formats known in the prior art or variations thereof. The data can be stored in the memory of the device that handles the raster image processor functionality. In this manner, a set of dot images can be generated, representing each desired tonal value. Next, the AM screen can be generated for an input continuous tone image, using the generated halftone dot representations.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium.

It can be easily recognized, by one skilled in the art, that the aforementioned method for generating a halftone dot, an AM screen, printing, and/or verifying a printout authenticity, may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs including computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for generating an amplitude modulated multi-cluster halftone dot for use in an amplitude modulated screen, the method comprising the following steps:
   determining an arrangement of clusters within the dot;
   determining a cluster function for each cluster, the cluster function defining a pixel sequence indicating a sequence of turning on device pixels within an area of a particular cluster;
   providing at least two clusters within the dot having different shapes and different numbers of the device pixels;
   determining a dot function for the dot, the dot function defining a cluster sequence;
   indicating a sequence of the clusters; and
   generating a set of data representative of the dot for a particular tonal value, by determining the device pixels within the dot turned on for that particular tonal value according to the cluster functions and the dot function.

2. The method according to claim 1, which further comprises providing at least two clusters within the dot having different shapes.

3. The method according to claim 1, which further comprises using the cluster function to define that successively turned-on pixels are adjacent at least one pixel being already turned on within that cluster.

4. The method according to claim 1, which further comprises using the set of data representative of the dot to determine the device pixels being turned on within a number of clusters corresponding to the desired tonal value, according to the cluster sequence determined by the dot function, and turning on the device pixels within the respective clusters according to the sequence determined by the cluster function of the respective cluster.

5. The method according to claim 1, which further comprises using the dot function to define that in at least one cluster at least two more device pixels are turned on than in other clusters for at least one tonal value.

6. A computer-implemented method for generating a set of data representative of an amplitude modulated screen for a continuous tone image by amplitude modulated screening, the method comprising the following steps:
   generating the halftone dots according to the method of claim 1.

7. A non-transitory computer-readable medium storing a program product, comprising: a program code for performing all of the steps of the computer-implemented method according to claim 1 when said program code is running on a computer.

8. A non-transitory computer-readable program product representative of the set of data representative of the dot, generated by the method according to claim 1.

9. A non-transitory computer-readable program product representative of the set of data representative of the amplitude modulated screen, generated by the method according to claim 6.

10. A method for printing, the method comprising the following steps:
    printing an amplitude modulated screen generated according to claim 6.

11. A printing press, comprising:
    a device for computer-implemented generation of an amplitude modulated multi-cluster halftone dot for use in an amplitude modulated screen, said device being configured for:
    determining an arrangement of clusters within the dot;
    determining a cluster function for each cluster, the cluster function defining a pixel sequence indicating a sequence of turning on device pixels within an area of a particular cluster;
    providing at least two clusters within the dot having different shapes and different numbers of the device pixels;
    determining a dot function for the dot, the dot function defining a cluster sequence;
    indicating a sequence of the clusters; and
    generating a set of data representative of the dot for a particular tonal value, by determining the device pixels within the dot turned on for that particular tonal value according to the cluster functions and the dot function.

12. A printing product printed by using an amplitude modulated screen generated according to claim 6.

13. A method for generating printing products, the method comprising the following steps:
   determining a printout identifier;
   generating a personalized dot function for generating a personalized halftone dot;
   generating the printing product according to the method of claim 1 by using the personalized dot function; and
   storing, in an authentication database, the printout identifier and personalized halftone dot data corresponding to the printout identifier.

* * * * *